United States Patent [19]

Berglund et al.

[11] Patent Number: 5,082,243
[45] Date of Patent: Jan. 21, 1992

[54] GAS CONTAINER, A COUPLING FOR A GAS CONTAINER, AND A METHOD OF MAKING A GAS CONTAINER

[75] Inventors: Göran Berglund, Sandviken; Gösta Lyen, Sollentuna; Torsten Westberg, Svärdjö, all of Sweden

[73] Assignee: Sandvik AB, Sandviken, Sweden

[21] Appl. No.: 440,310

[22] Filed: Nov. 22, 1989

[30] Foreign Application Priority Data

Nov. 24, 1988 [SE] Sweden ............................. 8804247

[51] Int. Cl.⁵ .................................................. F16K 51/00
[52] U.S. Cl. ................................... 251/144; 251/148; 285/332.1; 285/334.4
[58] Field of Search ................... 251/148, 144, 368; 285/332.1, 334.4

[56] References Cited

U.S. PATENT DOCUMENTS

| Re. 29,376 | 8/1977 | Hiszpanski | 285/169 |
|---|---|---|---|
| 1,133,320 | 3/1915 | Rockwood | 285/158 |
| 1,525,775 | 2/1925 | Floyd et al. | 251/144 |
| 4,316,624 | 2/1982 | Davlin | 285/158 |
| 4,540,205 | 9/1985 | Watanabe et al. | 285/329 |
| 4,555,129 | 11/1985 | Davlin | 285/3 |

FOREIGN PATENT DOCUMENTS

| 0303840 | 2/1989 | European Pat. Off. | |
| 0314609 | 5/1989 | European Pat. Off. | |
| 733853 | 4/1943 | Fed. Rep. of Germany . | |
| 2031353 | 12/1971 | Fed. Rep. of Germany . | |
| 342884 | 2/1972 | Sweden . | |
| 908796 | 10/1962 | United Kingdom | 251/144 |

Primary Examiner—A. Michael Chambers
Attorney, Agent, or Firm—Burns, Doane, Swecker & Mathis

[57] ABSTRACT

A coupling connects a valve structure to a container for enclosing pure gas under high pressure. The neck of the container and the valve structure include cooperating contact surfaces. One of the contact surfaces is convexly curved, or alternatively is of frusto-conical shape. The other of the contact surfaces is of convex spherical shape. A sealing ring is compressed between those contact surfaces. The inner surface of the container is polished to achieve a high degree of smoothness. The container is formed of a top part, and a bottom portion welded to an intermediate mantle.

7 Claims, 4 Drawing Sheets

GAS CONTAINER, A COUPLING FOR A GAS CONTAINER, AND A METHOD OF MAKING A GAS CONTAINER

BACKGROUND OF THE INVENTION

The present invention relates to a gas container, a coupling for the gas container, and a method of making the container. The coupling is arranged between the gas container and a valve comprising a nut and cooperating flange surfaces. The container is arranged to contain pure gases under high pressure and comprises a top part, a bottom part and a mantle. The top part is provided with an externally threaded neck. The method relates to the manufacturing of a metallic container intended for high pressure applications, preferably a container of stainless steel for enclosing of pure gases.

In certain gas applications in medicine, electronics and the pharmaceutical industry there are extremely high demands upon the purity of the gases. Due to the purity demands, the surfaces of articles or material coming into contact with the gases have to be prepared in such a way that the risk of contamination, for example by loose particles on the inner surfaces of the equipment, is eliminated.

One traditional technique of manufacturing gas containers involves so-called "spinning" of the ends of seamless tubes at high temperature, whereby, the entire container is prepared as one integral piece. Usually, high-strength low-alloyed Cr-Mo steels are used which require heat treatment after the deformation process in order to produce the desired strength properties. The design pressure of this kind of containers can be several hundred bar.

The problem with these known containers is that it has been very difficult to make the extremely smooth surfaces which the applications of pure gas demand Furthermore, the carbon steels in themselves present a potential impurity risk because that material not corrosion resistant. Therefore, certain gases can react with the steel surface if moisture is present and will form corrosion products which are unacceptable from the point of view of purity.

Until now, it has been found impossible to solve the above-mentioned problems by using conventional techniques, because of the risks of "pipe" appearing in the bottom during the welding and because of a rough surface which is formed in the zone where the container becomes narrower towards the valve opening in the top of the container.

Conventional valve connections for gas containers are usually provided with conical threads made tight with some kind of packing material, TEFLON ® or the like. This kind of thread demands great care during the connection of the valve in order to obtain proper sealing, and the direct contact between gas, packing and thread root means a potential impurity source both during the evacuation of the container at increased temperatures and during its use.

A coupling whose purpose is essentially different from the aim of the present invention and which is designed to be welded on a container for liquids is described in U.S. Pat. No. 4,316,624. That coupling comprises a connection part, an adapter and a nut. The adapter supports a tube being threaded in one part wherein an unavoidable clearance is formed between the ends of the adapter and the tube which can be occupied by impurities. The connection part is welded to a tube or similar in which liquid flows. Couplings are generally subjected to bending stresses, and the location of the weld in the direct connection of the coupling is therefore unfavorable. The weld is also difficult to work because of poor accessibility.

An object of the present invention is to provide a coupling for a gas container which resists a contamination of pure gases.

Another object of the present invention is to provide a coupling for a gas container which is insensitive to the carefulness of the mounting.

A further object of the present invention is to provide a gas container which resists contamination of pure gases.

Another purpose of the present invention is to provide a method of making a gas container for enclosing pure gases and intended for high pressure applications.

SUMMARY OF THE INVENTION

The present invention relates to a coupling between a valve structure and a container for enclosing pure gas under high pressure. The invention also involves the container per se and the method of making the container. The container has a neck which defines a longitudinal center axis. The container neck and the valve structure include cooperating contact surfaces. One of the contact surfaces is convexly curved or alternatively is of frusto-conical shape oriented such that an imaginary apex defined by the frusto-conical shape extends into the container. The other contact surface is of convex spherical shape. A sealing ring is compressed between the contact surfaces. A nut secures the valve structure to the container neck.

The container is formed of a corrosion resistant material and has a continuous inner surface. The surface evenness of which is at most 3 $\mu$m. The mantle comprises a seamless cylindrical tube.

The container is made by welding together a metallic top part, a metallic bottom portion, and a metallic mantle disposed between the top part and the bottom portion. Inner surfaces of the top part, bottom portion, and mantle are treated to establish a surface evenness no greater than 3 $\mu$m.

BRIEF DESCRIPTION OF THE DRAWING

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
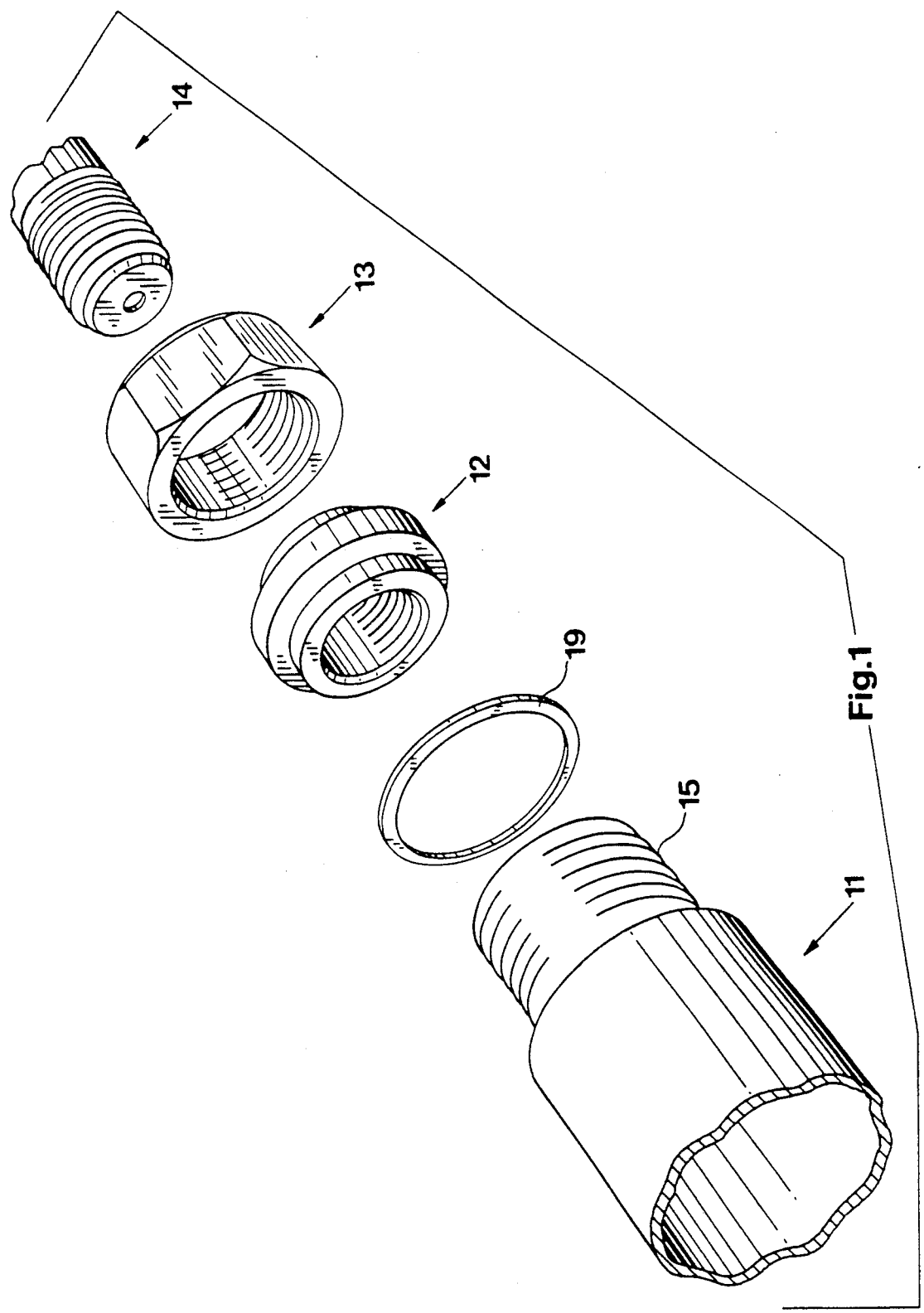
FIG. 1 is an exploded perspective view of a first embodiment of a coupling according to the present invention.
Figure 2:
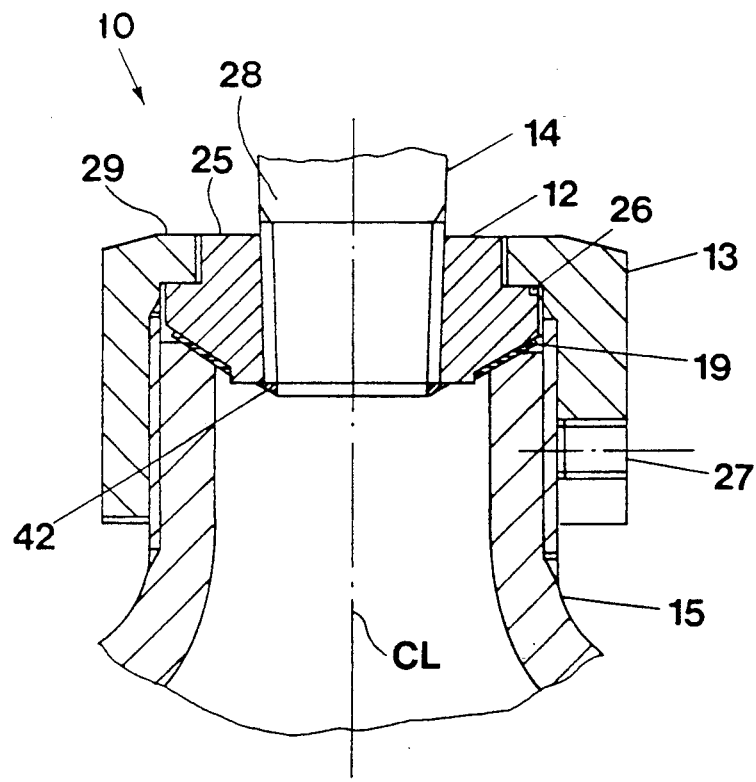
FIG. 2 is a longitudinal sectional view through the coupling of FIG. 1.
Figure 3:
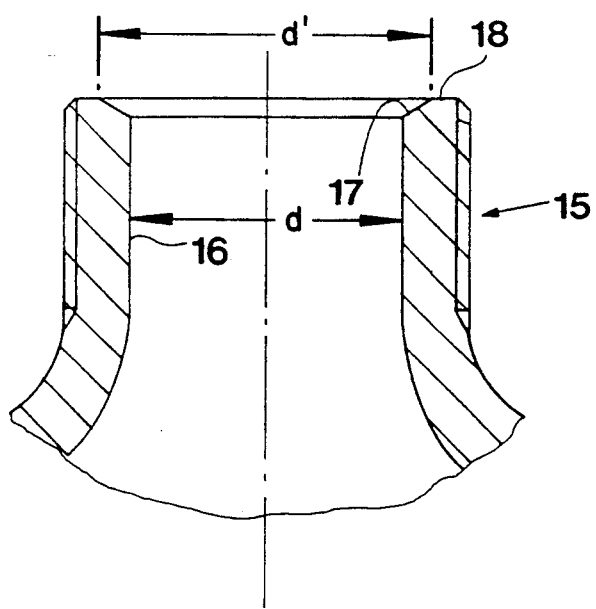
FIG. 3 is a longitudinal sectional view through a gas container according to the first embodiment.
Figure 4:
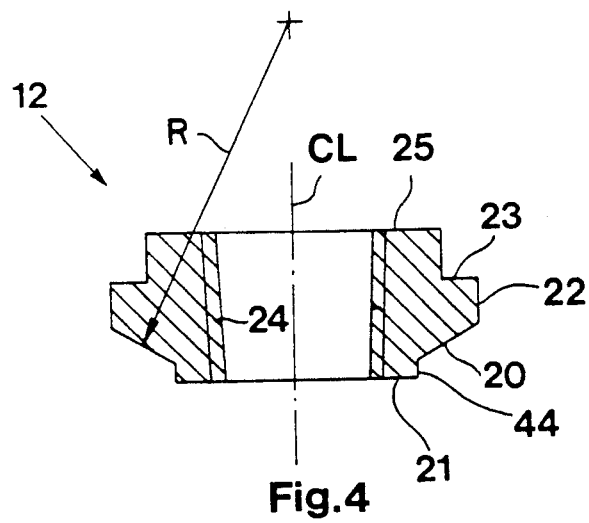
FIG. 4 is a longitudinal sectional view through an adapter suitable for use in first and second embodiments of the invention.
Figure 5:
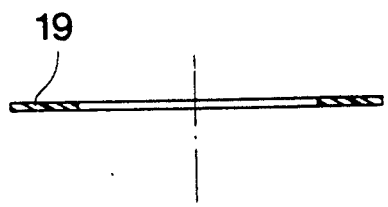
FIG. 5 is a longitudinal sectional view through a sealing ring suitable for use in first and second embodiments according to the invention.

In FIGS. 1 to 5, a preferred embodiment of a coupling according to the present invention is shown. The coupling 10 comprises a gas container 11, a sealing ring 19, an adapter 12, a nut 13 and a valve 14 being partly shown.

The gas container 11, which is described in more detail in connection with FIG. 6, has a neck 15, which is externally threaded. The inner cylindrical surface 16 of the neck 15 is completely smooth and connects to a frusto-conical first contact surface 17. The surface 17 is arranged such that an imaginary apex defined by the frusto-conical shape extends into the container. That surface 17 connects to a planar circular ring end surface 18.

Figure 7:
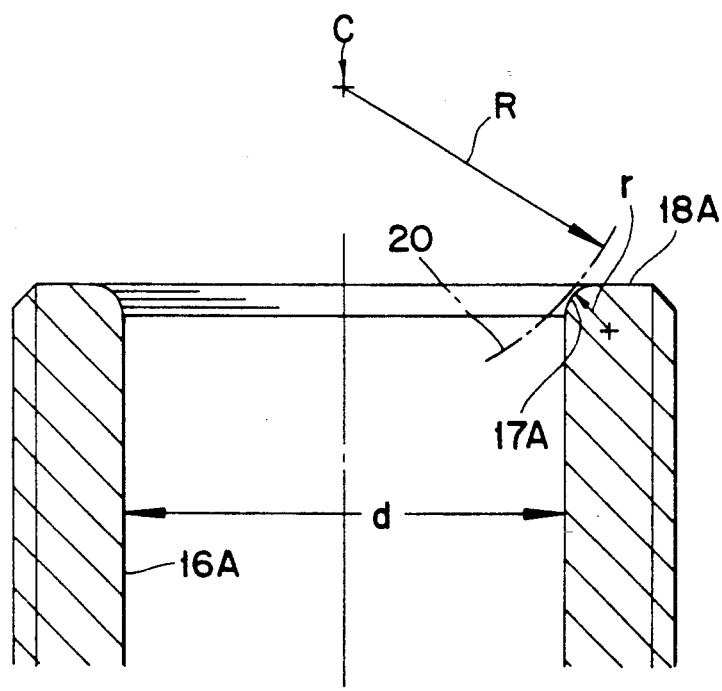
FIG. 7 is a view similar to FIG. 3 of a second embodiment according to the invention.

Alternatively, in applications where extreme demands of tightness are raised, a design is preferred as shown in FIG. 7, where the transition between the inner surface 16A and the end surface 18A comprises a gently convexly rounded part 17A suitably with a radius r of about 2–4 mm. The convex surfaces 20, 17A would cooperate to produce a very tight engagement against the ring 19 sandwiched therebetween.

The container has a weld 43 (FIG. 6) arranged a distance L from the end surface 18 of the neck 15 to a location where the container has its greatest diameter D for maximum strength against bending stresses. The container has a wall thickness t equal to about 1 to 10% of the greatest inner diameter D of the container.

The sealing ring 19 is a circular ring from and is made of silver or other soft metallic material, for example nickel. The inner diameter of the ring is smaller than the inner diameter d of the contact surface 17 (see FIG. 3). The outer diameter of the ring exceeds the outer diameter d' of the contact surface 17. The outer diameter of the ring is smaller than or the same as the outer diameter of the adapter 12 described below.

The adapter 12 has a generally cylindrical shape and its front surface comprises a second contact surface 20 in the shape of a section of a sphere (i.e., spherical about a center C). A radially inner edge of the surface 20 connects to a cylindrical edge surface 44, and a radially outer edge thereof connects to a cylindrical edge surface 22. The edge surface 44 centers the sealing ring 19 in relation to the contact surface 20. The surface 20 is defined in longitudinal section by a radius R (R > r). The edge surface 22 borders on a circular flange surface 23, which has its extension perpendicular to a central axis CL of the adapter; that axis is also the central axis of the coupling 10. A conically threaded bore 24 is concentrically arranged with the central axis, which bore extends between planar circular ring-shaped end surfaces 21 and 25 of the adapter. The cone angle of the bore 24 is suitably 25 to 45 degrees. The surfaces 21 and 25 are parallel. The center C of the radius R is arranged on the central line CL at a distance outwardly from the end surface 25.

The nut 13 is of a conventional type and comprises a flange surface 26 oriented perpendicular to the central line CL. The minimum diameter of the nut is smaller than the maximum diameter of the contact surface 17. The nut also comprises a stop screw 27.

The valve 14 has a hollow shaft 28, one end of which is conically threaded. A valve connection and a measuring device can be arranged in the other end of the shaft.

The coupling is mounted in the following way. The shaft of the valve 14 is brought through the nut 13 and is aligned with and threaded in the bore 24 of the adapter 12. Thereafter, the threads are sealed at the end of the shaft and the front surface 21 by a weld 42 or a glue joint. The welding of the adapter and the valve means that these elements constitute a non-detachable unit. Alternatively, the elements can be cast as a one-piece unit.

Then, the planar sealing ring 19 is aligned with and placed on the planar end surface 18 of the container neck 15 whereafter the adapter is applied to the ring 19 and the nut is moved towards the neck. The nut is screwed along the neck by a suitable tool, for example a wrench, so that the contact surface 26 of the nut is engaged with the flange surface 23 of the adapter, whereupon the partly spherical contact surface 20 of the adapter elastically or plastically deforms the ring 19 against the contact surface 17 of the neck. The ring essentially forms itself in conformance with the surfaces 20 and 17 and creates a seal between those surfaces.

The design of the surfaces 17 and 20 results in the creation of a circular, linear increase of pressure stresses in the coupling. Therefore, the material of the ring is displaced in the direction towards its inner and outer diameters which renders a secure seal. The increase of the pressure stresses is independent of how carefully the adapter is applied to the neck, due to the conical and partly spherical shapes of the surfaces 17 and 20, respectively. The end surface 25 of the adapter lies essentially in the same plane as a top end surface 29 of the nut.

The resulting coupling resists the contamination of pure gases because of its lack of recesses. It is stable and insensitive to the carefulness of the assemblage.

Figure 6:
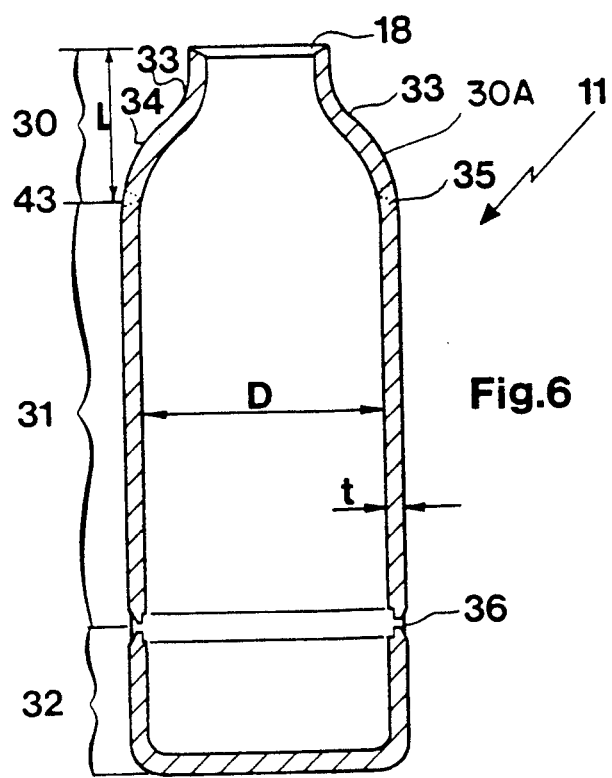
FIG. 6 is a longitudinal sectional view through an entire gas container according to the first embodiment of the coupling.

In FIG. 6, a container 11 is shown arranged to contain pure gases under high pressure. For the sake of clarity, the FIGURE shows the container before welding a bottom portion thereof. The container is made of a corrosion-resistant material, preferably a stainless steel material having good weldability and excellent strength, such as a ferrite-austenitic stainless steel, a ferrite-martensitic stainless steel or the like. Ferrite-austenitic steels and ferrite-martensitic steels have considerably better strength than austenitic steels and they are therefore very well suited as materials in high pressure containers. The better suited the steel, the more slender the construction of the gas container, which means that the handling is simpler and that material is saved. These kinds of steels are also preferable compared to austenitic steels from a corrosion point of view because of a considerably better resistance to crevice corrosion.

Exemplary of suitable ferrite-austenitic steels is SAF 2205 with nominal analysis max. 0.03% C, 0.4% SI, 1.6% Mn, 22% Cr, 5.5% Ni, 3% Mo and 0.14%N. Another example is SAF 2304 with an analysis comprising in percent by weight: 0.06% C, 21–24.5% Cr, 2–5.5% Ni, 0.05–0.3% N, max. 1.5% Si, max. 2.0% Mn, 0.01–1.0% Mo, 0.01–1.0%Cu, the rest Fe and normal impurities, the amounts of the components being so optimized that the content of ferrite is 35 to 65 percent.

Another example of a ferrite-austenitic material is SAF 2507 with the analysis max. 0.05% C, 23–27% Cr, 5.5–9.0% Mo, max. 0.5% Cu, max 0.5% W, max. 0.010% S, max. 0.5% V, Ce up to 0.18%, the rest Fe and usual impurities, the amounts being adjusted so that the content of ferrite after solution heat treatment at 1075° C. is 30 to 55%.

Exemplary of a suitable ferrite-martensitic steel is a steel alloy described in Swedish Patent Application No. 8704155-4 containing, in percent by weight, max. 0.1 C, 0.1-1.5 Si, 1.0-5.0 Mn, 17-22 Cr, 2.0-5.0 Ni, max. 3.0 Mo, max. 0.2 N and the remainder Fee and normally present impurities.

Other suitable kinds of steel suitable for high pressure containers are austenitic stainless steels with enhanced contents of nitrogen. The nitrogen considerably improves the strength and has a favorable influence on the corrosion resistance.

In order to considerably differ from the strength of ordinary austenitic steels and to give intended weight reductions, it is necessary that the steels have a strength of at least 400 N/mm$^2$ and a simultaneous rupture elongation of at least 12%. This is fulfilled by all of the above-mentioned preferred types of steels and in this connection designated as "high strength stainless steels". The container 11 comprises a top part 30, and a body comprised of a mantle 31 and a bottom part 32. The weld 43 joins the top part and the mantle. The portion 30A of the top part 30 extending from the neck 15 to the mantle is essentially spherically shaped.

The top part 30 is provided with the above-mentioned neck 15 and, in the shown longitudinal section, has curved shoulders 33 which transform into straight parts 34. The parts 34 end, when in a non-welded condition, at a base 35. The distance L between the end surface 18 and the base 35 is about 50 to 150% of the maximum inner diameter D of the container. The mantle 31 comprises a cylindrical seamless tube, i.e., a tube which has no axially directed weld. The bottom part 32 comprises a forged or hot-pressed gable which has an upper edge 36. After preparation of the joint there follows a treating of the inner surfaces of the parts 30-32 follows, i.e., the inner surfaces are polished or etched to a surface evenness where the height of any irregularities in the surface is at the most 3 $\mu$m, preferably less than 0.3 $\mu$m and most preferably less than 0.1 $\mu$m, after which the parts are welded together.

The above-mentioned container resists the contamination of pure gases because of its excellent surface finish and it exhibits a very good strength.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A coupling between a valve means and a container for enclosing pure gas under high pressure while resisting contamination thereof, said container having a neck defining a longitudinal center axis, said neck and said valve means including cooperating contact surfaces, one of said contact surfaces being of convexly curved shape as viewed in longitudinal section, the other of said contact surfaces being of convex spherical shape as viewed in longitudinal section, a sealing ring disposed between said contact surfaces, and a nut for securing said valve means to said container neck, whereby said sealing ring is compressed between said contact surfaces; said container comprised of a high strength stainless steel material containing ferrite and having a minimum strength of at least 400 N/mm$^2$ and a rupture elongation of at least 12 percent, an internal surface of said container forming a gas-containing chamber, said internal surface having a surface evenness such that the irregularities in said internal surface do not exceed 3 $\mu$m in height.

2. A coupling between a valve means and a container according to claim 1, wherein said valve means comprises a valve and a part in threaded engagement with an end of said valve facing said container and oriented coaxially therewith with reference to said central axis, said part and said valve being bonded to one another to prevent relative rotation therebetween, said part carrying said other contact surface.

3. A coupling between a valve means and a container according to claim 1, wherein said sealing ring is formed of a soft metallic material and includes inner and outer diameters, said one contact surface having longitudinally outer and inner ends, said outer end being spaced from said longitudinal axis by a distance defining an outer diameter of said one contact surface, said inner end being spaced from said longitudinal axis by a distance defining an inner diameter of said one contact surface which is smaller than said outer diameter of said one contact surface, said outer diameter of said one contact surface being smaller than said outer diameter of said sealing ring, said inner diameter of said one contact surface being larger than said inner diameter of said sealing ring, said container neck including a planar end face extending radially outwardly from a longitudinally outer end of said one contact surface.

4. A coupling between a valve means and a container according to claim 3, wherein a longitudinally inner end of said part includes a cylindrical surface coaxial with said longitudinal axis and projecting into said container neck, said outer contact surface intersecting said cylindrical surface.

5. A coupling between a valve means and a container according to claim 1, wherein said neck comprises a portion of a top part of said container, including a body part to which said top part is connected by a weld, said neck including an external thread connectable to an internal thread of said nut, an inner diameter of said body part at a location where said weld is disposed being larger than an inner diameter of said neck.

6. A coupling between a valve means and a container according to claim 1, wherein said container comprises a top part and a body secured to a lower end of said top part, said top part including said neck.

7. A coupling between a valve means and a container according to claim 6 wherein said body comprises a mantle part and a bottom part, said mantle part secured to said lower end of said top part, said bottom part secured to a lower end of said mantle part.

* * * * *